Jan. 25, 1938.                    D. G. MERRILL                    2,106,678
           DRIFT CONTROLLING APPARATUS FOR GLASSWARE ANNEALING LEHRS
                        Filed March 2, 1937           2 Sheets-Sheet 1
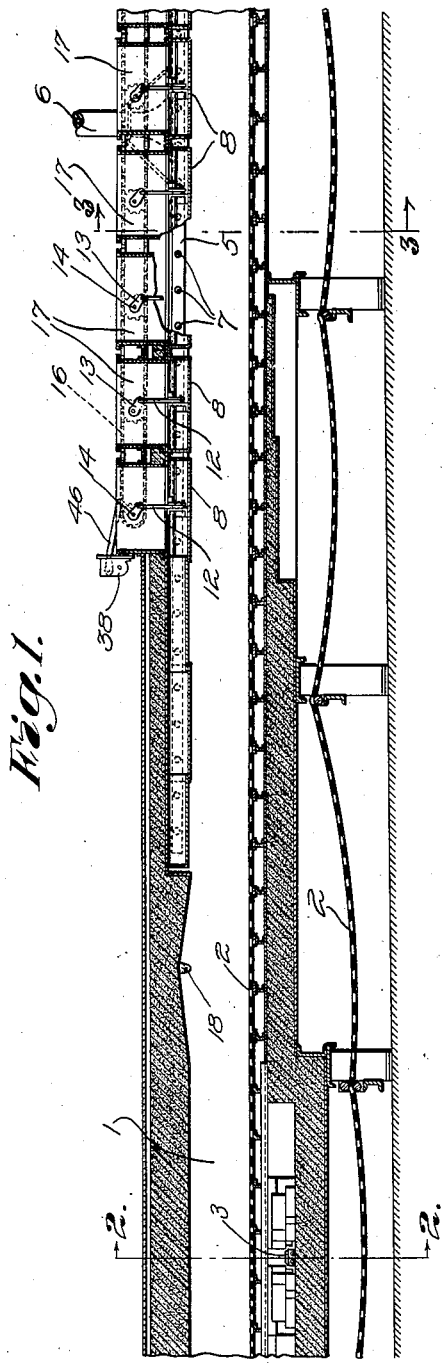

Jan. 25, 1938. D. G. MERRILL 2,106,678
DRIFT CONTROLLING APPARATUS FOR GLASSWARE ANNEALING LEHRS
Filed March 2, 1937 2 Sheets-Sheet 2
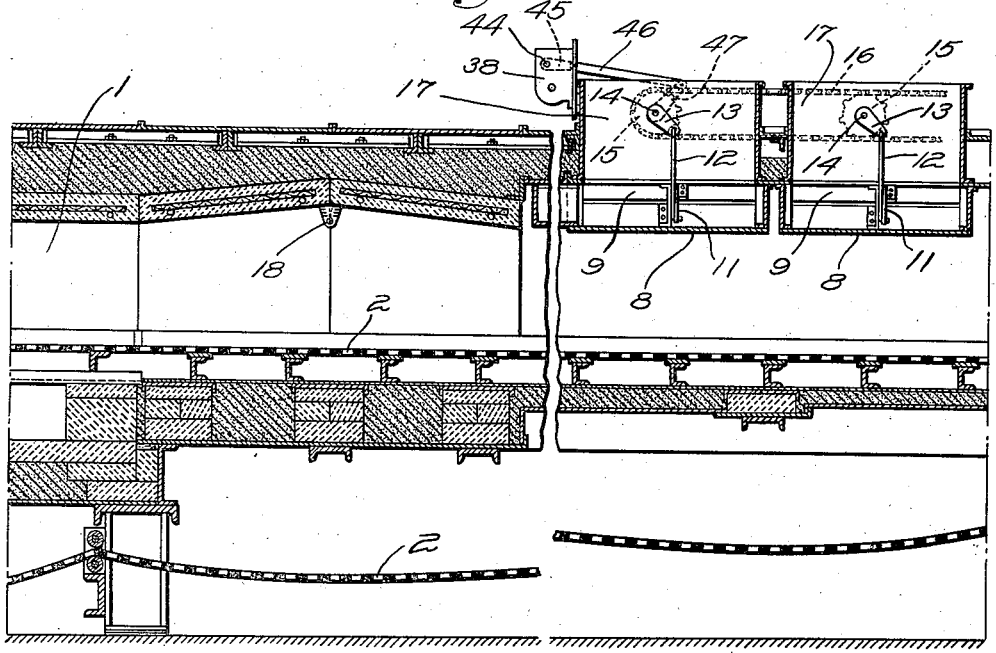
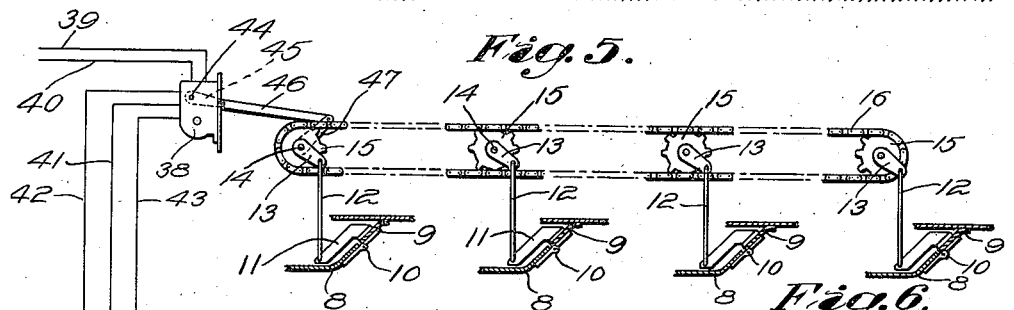
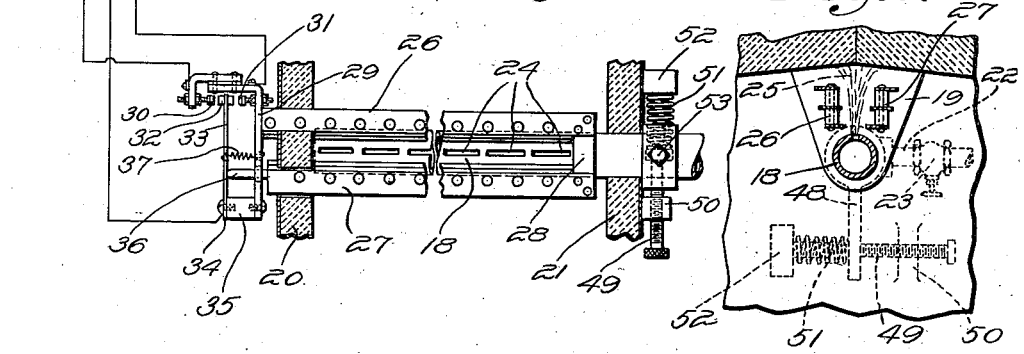
Inventor;
Donald G. Merrill
By Brown & Parham
Attorneys
Witness;
W. B. Phayer Patented Jan. 25, 1938

2,106,678

UNITED STATES PATENT OFFICE 2,106,678

DRIFT CONTROLLING APPARATUS FOR GLASSWARE ANNEALING LEHRS

Donald G. Merrill, West Hartford, Conn., assignor to Hartford-Empire Company, Hartford, Conn., a corporation of Delaware Application March 2, 1937, Serial No. 128,640

7 Claims. (Cl. 49—47)

My present invention relates to drift controlling apparatus for glassware annealing lehrs, and more particularly to certain improvements in such apparatus enabling it to be employed in a wider variety of lehrs than previous types of apparatus for similar purposes, and also overcoming certain difficulties in prior art apparatus.

Glassware is now usually annealed in a continuous manner by passing it through tunnel type annealing lehrs through which the ware moves continuously. As such, both ends of the lehrs must be open at least to the extent of permitting the introduction and removal of the ware, which is normally carried through the lehrs upon woven wire belts moving continuously through the tunnels. Due in part to the prevalence of drafts in the factory in which the lehrs are operated, which usually is caused by the extensive ventilation necessary in the glass factory and by external wind conditions, and also due in certain modern lehrs to the temperature controlling means associated with the lehr itself, there is a tendency for air or tunnel atmosphere to flow through the tunnel in one direction or the other. In many instances, it is desirable to have certain controllable currents of air flowing longitudinally of the lehr tunnel. However, if this air is not under definite control, it tends to interfere with the maintenance of the desired temperature gradient in the tunnel, and that in turn results in poor annealing. Various types of drift controlling apparatus have heretofore been proposed for use in glassware lehrs which have been more or less successful. They have, however, been subject to certain objections which will be hereinafter discussed. Among such apparatus are the structures disclosed in Wadman patents, Nos. 1,808,192, granted June 2, 1931; 1,809,996, granted June 16, 1931; and 1,896,874 granted Feb. 7 1933; and also the Wadman et al. patent, No. 1,973,452, granted Sept. 11, 1934.

Among the objects of the present invention are to provide for the establishment and maintenance of a desired manually adjustable drift, and more particularly to provide a manual adjustment for the automatic drift controlling system by which the system may be manually adjusted to maintain a desired drift and then operates automatically in maintaining that desired drift until it is further manually adjusted. In this way, I am enabled to provide for a desired drift or flow of air longitudinally of the tunnel in either direction and in a desired amount.

All devices of the prior art as far as are known involve the provision of an apparatus responsive to drift at but one point, not only longitudinally of the tunnel, but also laterally thereof. It has been found in practice that there may be a flow in one direction or in one velocity at one point, which may be the point at which the drift-sensitive device is located, while at some other portion in the same transverse plane in the tunnel, the drift may be in the other direction or in another amount or velocity. For these reasons certain of the prior art devices have not functioned as perfectly as might be desired in controlling drift in response to the average of the drift conditions in any one transverse zone.

A further object of the present invention is to overcome these difficulties and to provide for the control of drift in response to the average of conditions across all or a desired part of a single transverse zone in the lehr tunnel, as for example, from side to side thereof.

A further object of the present invention is to provide simple and reliable manually adjustable means for controlling the sensitivity of the drift-responsive means.

Other objects of the present invention will become apparent from the following specification and appended claims when taken in connection with the accompanying drawings, in which:

Figure 1 is a view principally in vertical longitudinal section of the central portion only of a lehr of the general type disclosed in my copending application, Serial No. 66,611, filed March 2, 1936, and having the drift responsive device of my present application applied thereto;

Fig. 2 is a view in vertical transverse section on the line 2—2 of Fig. 1;

Fig. 3 is a view in transverse vertical section on the line 3—3 of Fig. 1;

Fig. 4 is a view similar to a portion of Fig. 1, but on an enlarged scale and with a center portion broken out;

Fig. 5 is a diagrammatic view illustrating the relation between the drift responsive means and the drift controlling means associated therewith and also certain of the structural features of the drift responsive means; and Fig. 6 is a fragmentary view in vertical longitudinal section illustrating the drift responsive means and certain of the adjustments associated therewith.

While I have chosen to illustrate the novel drift controlling apparatus of the present invention associated with a lehr substantially as disclosed in my above-entitled prior application, which is of the direct fired and direct cooling type, I contemplate that the subject matter of the present invention may also be embodied in other types of lehrs, such for example as muffle lehrs, which are now well known in the art, or lehrs having partially muffled and partially direct heating or cooling means, and also lehrs wherein the heat may be supplied by electricity or in any other manner. I have not chosen to illustrate the invention as applied to these several types of lehrs as its application will be obvious from the following description and as the principles thereof are adequately illustrated in the present drawings and by the application to but one type of lehr.

Referring now to the accompanying drawings, there is illustrated a tunnel type glassware annealing lehr, including a tunnel 1 through which the ware may be carried upon a suitable endless open-work conveying means 2, the ware-bearing strand of which traverses the tunnel upon suitable supports and the idle strand returns to the entrance end of the tunnel beneath the lehr.

The lehr as shown in Figs. 1 and 4 of the drawings is arranged so that ware is moving from left to right, as seen in these figures. The means for drawing the conveyor 2 and the ware through the tunnel are not shown in the accompanying drawings and may be assumed to be conventional. The construction of the lehr itself and its supports form per se no part of the present invention, and further are fully disclosed in my copending application, Serial No. 66,611, above referred to.

As above set forth, the lehr of the accompanying drawings is of the direct fired and direct cooling type, that is, one in which the heat is supplied by products of combustion, which come into direct contact with the ware, and in which cooling is effected by air directed into and circulated in the tunnel in direct contact with the glassware passing therethrough.

For supplying heat to the tunnel, I have illustrated but one of a number of groups of burners at 3, this burner group being supplied with a combustible medium, usually gas, through suitable pipes indicated at 4, Fig. 2. The products of combustion from the burner group 3 circulates toward the sides of the tunnel from the burner, which is located below the ware-bearing strand of the conveyor 2, and centrally thereof, thence up the sides, toward the center of the tunnel above the path of the ware, and thence downwardly through the ware path and the open-work conveyor to be recirculated. I contemplate that most, if not all, the products of combustion from the burners 3 will pass out of the tunnel through or adjacent to the ware-entering end thereof. Under some circumstances, however, particularly where very light loadings are employed or in preheating the lehr, it may be desirable that some of the products of combustion from the burners 3 pass toward the exit end of the tunnel and out through the exhaust means in the cooling portion thereof, hereinafter to be described. The present invention provides for this type of operation as will presently appear.

In the cooling portion of the tunnel, there are provided means for introducing cooling air into the tunnel and circulating tunnel atmosphere therein. For this purpose, there are illustrated pipes 5 extending longitudinally of the tunnel in the upper corners thereof and arranged to be supplied with air or wind under pressure from a suitable source through supply passages 6, one of which is shown at Fig. 1. Suitable means, usually a blower (not shown) may be provided for supplying air under pressure to the pipes 6. Reference may be had to my said copending application for a specific disclosure of such means. The pipes 5 are provided at spaced intervals therealong with nozzles 7, which are directed toward the center or median portion of the tunnel above the path of the ware. In alignment with these nozzles are deflectors, generally indicated at 8, having inclined sides as shown, which deflect the air downwardly in the center portion of the tunnel through the path of the ware and through the open-work conveyor 2. The circulated medium thence passes laterally below the path of the ware, then upwardly along the sides of the tunnel and is recirculated by the jet or inductive action of the nozzles 7.

The upper portions 9 of each of the deflectors 8 on each side are hingedly connected to the lower portions thereof at 10, as best seen in Fig. 5. Each of the movable portions or dampers 9 is provided with a rigid arm 11, which is connected through a link 12 with a crank arm 13, secured to a transversely extending axle member 14.

In the present case, the several axle members 14 are each provided with a sprocket 15, and around all these sprockets is trained an endless chain 16. Thus, in the arrangement as herein disclosed, all the damper members 9 may be moved as a unit by a common moving means hereinafter to be described. It will be understood, however, that if desired, there might be provision for relatively moving the different damper members, as by providing some of the sprockets with a larger number of teeth than others; and also means may be provided for engaging certain of the sprockets with the chain 16 with their associated dampers in different initial positions. Such possible variations will be obvious, however, to those skilled in the art and need not be further described.

From the foregoing, it will be seen that if some of the members 9 are partially opened, they will serve in that partially opened position to assist in deflecting a part of the air and recirculating it as aforesaid; and also another part of the air from the jet nozzles 7 opposite these damper members, and some of the air entrained thereby, will pass between the upper margins of the partially open damper members 9 and the roof of the tunnel into the interior portions of the deflecting members 8 and will pass therefrom out of the tunnel through the associated open outlet ports shown at 17. This apparatus in practice serves as a means for the removal of tunnel atmosphere from the tunnel under the control of the damper members 9. Also, while a certain amount of air is being introduced into the tunnel in the cooling portion thereof through the nozzles 7, and while also some may be induced to flow into the open exit end of the tunnel in a manner as defined in my copending application above referred to, specifically by inclining some of the nozzles 7 from the exit toward the entrance end and thus inducing an inflow of air at the exit end of the tunnel by the inductive action of the nozzles 7, means are provided for removing some or all of this air from the tunnel under control of the damper members 9.

Furthermore, it will be seen that if there is a flow of tunnel atmosphere from the heated section of the tunnel toward the cooler section thereof, such tunnel atmosphere may also be exhausted through the ports 17. On the other hand, it may be in certain cases that it is desired to carry the cooling further forward in the lehr. Under these circumstances, the equipment may be arranged so that some of the cooling air will be caused to flow from the cooling portion of the tunnel toward the heated portion thereof, due to the fact that the exit means provided in the cooling portion may be so adjusted, as by closing the damper members 9 to a certain extent, that the pressure built up in the tunnel in the cooling portion will be greater than that in the heated portion.

Thus, in the present lehr at least, there is provision within the lehr itself and by the operation of the normal operating and temperature controlling means thereof for causing a drift in either direction between the heated and the cooling portions thereof. In addition to this, there is always a situation, which must be taken into account, of drafts or other wind conditions in or around the factory, which may tend to cause a drift of tunnel atmosphere in one direction or the other through the tunnel. If this drift or flow is uncontrolled, the temperature gradient in the lehr will be to a certain extent uncontrolled. This is not desired. My present invention, therefore, provides means by which this drift through the tunnel may be accurately and automatically controlled, preferably from a point intermediate the heated and cooling sections thereof, so as to establish either a condition of zero drift at the control point or a desired flow or drift in either direction and in a desired amount.

Associated with a desired part of the lehr, preferably between the heated section and the cooling section, I provide a means responsive to drift along the tunnel in one direction or the other with which is associated a drift controlling means. For this purpose, there is shown a pipe 18, Figs. 1, 4, 5 and 6, which is mounted for rotation about its own longitudinal axis in brackets 19 (Fig. 6), these brackets being respectively associated with the opposite side walls of the lehr, which are shown in Fig. 5 at 20 and 21 respectively. The pipe 18 extends through one of the side walls and is provided outside the lehr with a suitable coupling means (not shown) permitting the adjustive rotation of the pipe 18 as hereinafter set forth, and to which coupling is connected an air supply pipe 22 having a suitable valve 23 therein for controlling the pressure of the air or other gaseous medium supplied through the pipe 22 to the pipe 18. It will be understood that air or other gas under pressure may be supplied to the pipe 22 from any suitable source. This air is usually supplied from the fan which is also employed to furnish the air used in the cooling section of the lehr.

The pipe 18 is shown as provided with a plurality of elongated apertures 24 all lying in the same plane for supplying the gaseous medium, which in this case is cold air, into the tunnel in the form of a sheet 25, which lies substantially in a single plane extending transversely of the lehr. While I have shown a plurality of individual openings 24, it will be understood that a fewer number or even one such opening, extending a desired part or all the way across the tunnel, may be employed. On the opposite sides of the mid position of the sheet of air 25, there are provided temperature responsive devices shown at 26 and 27. These devices may be of any desired type including simple expansible metallic members, or built up members as shown in the accompanying drawings, or flexible bi-metallic means as disclosed in the Wadman patent, No. 1,808,192, or electrical means as disclosed in the Wadman et al. Patent 1,973,452 above referred to.

As illustrated in Fig. 5, however, the temperature responsive expansible means 26 and 27 are rigidly secured together at their inner ends at 28, this common securing means preferably being loosely sleeved about the pipe 18 in order to prevent dislodgment or undesired movement of the parts. The members 26 and 27 preferably extend through one side of the lehr, the opposite side from that through which pipe 18 extends, as shown in Fig. 5, and outside the lehr are provided with means for making and breaking electrical contacts.

As shown, such means comprise a frame member 29, which may be secured to the member 26 and which is provided with a pair of spaced electrical contacts 30 and 31 suitably insulated from each other and from the frame member 29. Intermediate the contacts 30 and 31 is a movable contact 32 mounted on the end of a flexible member 33, which is secured at its lower portion, as seen in Fig. 5, at 34 to an insulating member 35, the latter being secured to the frame member 29. The expansible member 27 is provided with an extension 36 passing freely through a hole in the frame member 29 and bearing against the flexible member 33 for actuating it. The flexible member 33 is urged against the end of the extension 36 by a tension spring 37 connected to the flexible member 33 and to a rigid anchorage on the frame member 29.

Thus, for example, if there is a relative expansive movement between the members 26 and 27 in which the member 26 expands more than the member 27, due to being at a higher temperature, the spring 37 acting on the flexible member 33 will keep it against the end of the member 36, which moves very little if any to the left as seen in Fig. 5, while the frame member 29 will be moved farther to the left as seen in that figure. This will cause the engagement of the movable contact member 32 and the contact member 31. Reverse expansion of the relatively expansive members 26 and 27 will similarly cause contact between the movable contact member 32 and the relatively stationary contact member 30.

I have illustrated diagrammatically an operating mechanism including a reversible motor and associated reducing gearing means at 38, such mechanism being common in the art and being available for purchase on the open market, so that the details need not be now described. This mechanism is provided with current from line wires 39 and 40. One side of the line is connected directly to the motor, while the other side is connected to a common wire 41, which is connected to the flexible member 33, as shown. The contact members 30 and 31 are connected through wires 42 and 43 respectively each with one side of two opposed windings in the reversible motor forming a part of the mechanism 38. Thus, when contact is made between the moving contact member 32 and the fixed contact member 30, the motor will be operated in one direction; while if the moving contact member 32 engages the contact member 31, the motor will be operated in the opposite direction.

The mechanism 38 is provided with a driving shaft 44 having secured thereto a crank arm 45, which is connected by a suitable link 46 with a crank 47 secured to one of the shafts 14 and operative through the chain 16 to rotate all the shafts 14 and thus to operate all the damper members 9.

Let us assume first that the pipe 18 is adjusted so that it directs the sheet of air 25 vertically, substantially as shown in Fig. 6, and that it is desired that a zero drift be established and maintained along the tunnel past the drift responsive device. If, now, there is a drift from the entrance end toward the exit end of the lehr, or from left to right, as seen in Figs. 1 and 4, then the sheet of cold air will be blown by the drift toward the temperature responsive device 27, while hot air from the hotter end of the tunnel will impinge upon the temperature responsive device 26. This will cause a relative expansive movement between the members 26 and 27 in which the member 26 expands to a greater extent than the member 27. This, as above set forth, will cause the engagement of movable contact 32 with fixed contact 31, which will close a circuit through wires 41 and 43 to cause the operation of the motor within the mechanism 38 in a direction to close the dampers 9 to a certain extent. It is understood, of course, that the motor within the device 38 is suitably geared down, so that a relatively small adjustment will be made in any short period of time. However, the closing of the dampers 9 will reduce the amount of tunnel atmosphere exhausted from the tunnel in the cooling portion, so that pressure in this portion will build up and oppose the drift which caused the unbalancing of the drift responsive device. The reverse series of operations may be traced similarly and involves the closing of a circuit through the wires 41 and 42 by the engagement of contact members 30 and 32.

It will be understood, of course, that any suitable intermittent acting device, the use of which is common in the art, may be superimposed upon the very elementary circuit here diagrammatically illustrated and described in order that a certain predetermined adjustment of the members 9 will be made, then time given for the apparatus as a whole to respond to this adjustment before any further adjustment is made.

It will be further understood that suitable limit switches (not shown) may be employed in connection with the operation and adjustment of the damper members 9 by the motor operated device 38. These expedients are common and well known in the art and, hence, have not been illustrated herein.

If, now, it is desired that a certain predetermined drift be set up and maintained in one direction or the other, this may be done in either of two ways. In the first place, the contact members 30 and 31 may be so adjusted toward or away from the mid-position of the flexible member 33 that they will be engaged only by a relative unbalance of the temperatures to which members 26 and 27 are subjected. This is a means common to several of the prior art devices above referred to.

I have found, however, that a more desirable and usually a more positive means for adjustably predetermining a drift in one direction or the other is by angularly adjusting the direction of injection of the gaseous media into the tunnel. For this purpose, the pipe 18 is adjustable about its own longitudinal axis, i. e., about a horizontal axis transverse of the tunnel, so as to incline the plane of the sheet of gas 25 supplied therefrom toward one end or the other of the lehr. This will cause an unbalanced condition in the temperatures of members 26 and 27, which may be balanced again by a predetermined drift in one direction or the other, specifically by the predetermined drift which it is desired to establish and maintain. Then when the system comes to equilibrium, that predetermined drift will be established, which will so bend the direction of flow of the gas (or air) introduced into the tunnel, as shown at 25, as again to establish a selected temperature relation between the members 26 and 27. I have found that this manner of regulating drift is very desirable, and in many instances is superior to that previously discussed involving the adjustment of the contact points.

In order to accomplish this adjustment practically, the pipe 18 has secured thereto a collar having a downwardly extending finger 48 rigid therewith, this finger being disposed outside the lehr (to the right of the wall 21 as seen in Fig. 5). Engaging against one side of the finger 48 is a set screw 49, which is suitably threaded through a stationary lug 50 formed on the side of the lehr, and may be adjusted by a knurled head on the outer end thereof. Opposing the set screw 49 on the other side of the finger 48 is a compression spring 51 extending between a stationary abutment 52 and the finger 48, as shown in Figs. 5 and 6. Means may also be provided for securing the pipe 18 against undesired movement once it has been adjusted, such means comprising a set screw passing through a suitable stationary collar and engaging the pipe 18. The head of this set screw is shown at 53 in Fig. 5. Thus by loosening the last named set screw and adjusting the set screw 49, the pipe 18 may be angularly or rotatably adjusted about its own axis in either direction to establish a desired drift in the tunnel as aforesaid.

While it is, of course, possible to adjust the sensitivity of the device by varying the spacing between the fixed contacts 30 and 31, I have found that a better way of doing this is to adjust the pressure of the gas (air in the present instance) supplied to and through the pipe 18 into the tunnel. For this purpose, the valve 23 is provided in the pipe 22 leading to the pipe 18. Under most circumstances, an ordinary gate valve may be employed for this purpose, but I contemplate that any desired type of valve, including special pressure regulating valves, may be employed if necessary. In this way, I have found that it is possible to obtain the desired sensitivity in a drift responsive device, which sensitivity will be different for different installations and sometimes different in a single installation, according to the conditions which may be met from time to time. In this way also I can compensate for changes in pressure in the supply line while still having the drift responsive device operate at a desired sensitivity.

The present application contains only claims limited to a drift controlling apparatus and to the combination of such apparatus with a glassware annealing lehr. My prior application, Serial No. 66,611 above referred to, includes claims to the lehr disclosed herein by way of illustration. Any inventive subject matter relating to this lehr not including the drift controlling apparatus is hereby reserved to that application.

I contemplate that certain features of my present invention may have independent utility, and further that many changes including certain of those herein suggested may be made both in the construction and the application of the device of my present invention. I do not wish to be limited, therefore, except by the scope of the appended claims, which are to be construed as broadly as the state of the prior art permits.

I claim:

1. Apparatus for annealing glassware, comprising an elongate tunnel, means for conveying glassware therethrough, drift controlling means associated therewith including means for projecting a gaseous medium into the tunnel at a temperature substantially different from the tunnel atmosphere at the point at which such means project the gaseous medium thereinto, said gaseous medium being projected into the tunnel in a direction lying in a plane substantially transverse of the tunnel, differential thermostatic means positioned adjacent to the path of introduction of the gaseous medium as aforesaid and constructed and arranged to be acted upon similarly when the gaseous medium is projected in a plane transverse of the tunnel and when there is no drift longitudinally of the tunnel, said thermostatic means being further arranged to react differentially when the flow of gaseous medium is projected in a plane other than a transverse plane and/or when the flow of gaseous medium is deflected by a drift longitudinally of the lehr, means responsive to said thermostatic means for controlling the flow of tunnel atmosphere longitudinally of the lehr, and means for adjustably varying the angle of introduction of the gaseous medium longitudinally of the lehr to establish a desired condition of drift or flow of gaseous medium longitudinally of the lehr.

2. Drift responsive and controlling apparatus for tunnel type glassware annealing lehrs, comprising means for introducing a gaseous medium into a lehr tunnel in a direction lying in a plane substantially transverse thereof, temperature responsive devices arranged adjacent to the path of the gaseous medium so introduced and respectively toward the two ends of the tunnel therefrom, means for adjustably controlling the direction of introduction of the gaseous medium toward one end or the other of the tunnel, and means controlled by said temperature responsive devices for controlling the drift of tunnel atmosphere along said tunnel.

3. Drift responsive and controlling apparatus for tunnel type glass annealing lehrs, comprising an air nozzle mounted in the lehr tunnel and arranged to direct a stream of air in a path lying in a plane substantially transverse of the lehr tunnel, similar expansible means mounted adjacent to said path and respectively toward the two ends of the tunnel therefrom, means for rotating said nozzle about an axis extending transversely of said tunnel in order adjustably to control the direction of introduction of the air toward one end or the other of the tunnel, and means controlled by relative expansion of said similar expansible means for controlling the drift of tunnel atmosphere along said tunnel.

4. Drift responsive and controlling apparatus for tunnel type glassware annealing lehrs, comprising means extending transversely of the tunnel for introducing gaseous medium thereinto in a sheet or plane substantially coextensive laterally with the tunnel and disposed substantially transversely thereof, temperature responsive devices extending transversely from side to side of the tunnel and arranged adjacent to the path of the sheet of gaseous medium so introduced and respectively toward the two ends of the tunnel therefrom, and means controlled by said temperature responsive devices for controlling the drift of tunnel atmosphere along said tunnel, whereby the lateral extent of the sheet of gaseous medium introduced into the tunnel and of said temperature responsive devices provides for a control of drift in response to an average of the drift across the tunnel.

5. Drift responsive and controlling apparatus for tunnel type glassware annealing lehrs, comprising a pipe extending transversely of the tunnel from side to side thereof and having means for directing a gaseous medium supplied to the interior of said pipe into the tunnel as a sheet, temperature responsive devices extending transversely from side to side of the tunnel and arranged adjacent to the path of said sheet of gaseous medium and on opposite sides thereof toward the respective ends of the tunnel, and means controlled jointly by said temperature responsive devices for controlling the drift of tunnel atmosphere along said tunnel, whereby the drift will be controlled in response to an average of the drift from side to side of the tunnel.

6. Drift responsive and controlling apparatus for tunnel type glassware annealing lehrs, comprising means for introducing a gaseous medium into a lehr tunnel in a direction lying in a plane substantially transverse thereof, temperature responsive devices arranged adjacent to the path of the gaseous medium so introduced and respectively toward the two ends of the tunnel therefrom, means controlled by said temperature responsive devices for controlling the drift of tunnel atmosphere along said tunnel, and means for controlling the pressure of the gaseous medium introduced into the tunnel as aforesaid to control the sensitivity of the drift responsive apparatus.

7. Drift responsive and controlling apparatus for tunnel type glassware annealing lehrs, comprising a pipe extending transversely from side to side of the tunnel of a glassware lehr above the path of the ware therethrough and having means for directing a gaseous fluid from its interior into the tunnel as a wide sheet lying in a plane substantially transverse of the tunnel, two temperature responsive devices each extending from side to side of the tunnel and both located adjacent to the path of said sheet of gaseous medium, one toward each end of the tunnel from said sheet, means for adjustably controlling the angle of introduction of said sheet of gaseous medium in respect to the longitudinal axis of the tunnel, means controlled by said temperature responsive devices for controlling the drift of tunnel atmosphere along said tunnel, and means for adjustably controlling the pressure of the gaseous medium introduced into the tunnel in the sheet as aforesaid for determining the sensitivity of the control effected by the aforesaid apparatus.

DONALD G. MERRILL.